(12) United States Patent
Takada et al.

(10) Patent No.: US 7,057,728 B2
(45) Date of Patent: Jun. 6, 2006

(54) COLOR CARD, COLOR BOOK COMPRISING THE SAME, AND COLOR CARD WITH PICTURE SAMPLE

(75) Inventors: Hiromichi Takada, Kakamigahara (JP); Shigeki Ito, Kakamigahara (JP); Hideki Yamauchi, Kakamigahara (JP); Kazunori Kurachi, Kakamigahara (JP)

(73) Assignee: Kikusui Chemical Industries Co., Ltd., Nagoya (JP)

( * ) Notice: Subject to any disclaimer, the term of this patent is extended or adjusted under 35 U.S.C. 154(b) by 251 days.

(21) Appl. No.: 10/603,870

(22) Filed: Jun. 25, 2003

(65) Prior Publication Data

US 2004/0004719 A1  Jan. 8, 2004

(30) Foreign Application Priority Data

Jun. 28, 2002 (JP) ............................. 2002-188827
Jul. 16, 2002 (JP) ............................. 2002-206548
Aug. 28, 2002 (JP) ............................. 2002-248061

(51) Int. Cl.
*G01J 3/52* (2006.01)

(52) U.S. Cl. ..................................... 356/421
(58) Field of Classification Search ................ 356/421, 356/422, 423, 424, 425
See application file for complete search history.

(56) References Cited

U.S. PATENT DOCUMENTS 6,270,123 B1 * 8/2001 Spangler ..................... 283/114
6,450,327 B1 * 9/2002 Kikuchi ....................... 206/1.7

FOREIGN PATENT DOCUMENTS

| DE | 201 18 637 U1 | 2/2002 |
|---|---|---|
| EP | 0 601 231 A1 | 6/1994 |
| GB | 2 252 750 A | 8/1992 |

* cited by examiner

*Primary Examiner*—Gregory J. Toatley, Jr.
*Assistant Examiner*—Roy M. Punnoose
(74) *Attorney, Agent, or Firm*—Davis & Bujold, P.L.L.C.

(57) ABSTRACT

A color card showing at least three color samples is provided. Among the color samples, a light color sample expressing a light color tone occupies a larger space than samples expressing the other color tones. A deep color sample expressing a deep color tone in the color card is arranged on one side of the light color sample, and a neutral color sample expressing a neutral color tone which stands between the light and deep color tones is arranged on the other side. Use of such a color card allows the user to roughly select a color card showing a color tone suited for being applied to an object to be painted from a plurality of color cards based on their light color samples, and then select one of color tones shown in the selected color card.

13 Claims, 13 Drawing Sheets

COLOR CARD, COLOR BOOK COMPRISING THE SAME, AND COLOR CARD WITH PICTURE SAMPLE

BACKGROUND OF THE INVENTION i) Technical Field of the Invention

This invention relates to color cards which show color tones obtained from paints for painting structures like buildings, and which are for selection of desired colors. This invention also relates to color books comprising such color cards, and color cards with picture samples.

ii) Description of the Related Art

Conventionally, color cards and color books comprising the same have been used for presentation and selection of color tones which show colors of paints after dried. In most cases, colors in the color cards are specified numerically and symbolically by the Munsell color system or the like, and the color samples are arranged according to the given numeric order.

The Munsell color system identifies colors by three attributes: hue, value and chroma, and provides numerical scales for the respective attributes. These attributes are given symbols, and colors are expressed with these symbols and numerals. Such notation of colors enables us to select a specific color to a certain degree of accuracy by the symbol and numeral. In other words, it is possible to specify a color to a certain degree of accuracy if the symbol and numeral applied to the color are known.

The notation allows us to definitely specify colors and eliminates ambiguity in expressing color tones. Colors can be distinguished appropriately without individual variation.

The color cards and color books which comprise colors with such notation are advantageous in specifying colors. However, we sometimes find it difficult to choose desired colors from such color cards and color books. This is because, in the color cards and color books, the colors are arranged simply in their numerical order, and so many color tones are listed to show even a subtle distinction of colors, like in deepness and lightness of color.

Furthermore, when applying two or more colors to an object to be painted or when selecting a color in view of the neighboring objects, it is difficult for us to find which combination of colors may offer a better impression of unity and appears well-organized if the aforementioned color cards and color books are used. In other words, each color is treated as a single color in the conventional color cards and color books. Thus, the number of colors tends to grow and there is no consideration for unity between the colors. Since the colors are only arranged according to the numerical order and are not classified by impressions received from the colors, similar color tones are arranged next to each other, making it difficult for us to choose desired colors with accuracy.

Furthermore, in the conventional color cards, color selection for the interior or exterior of buildings, interior furnishings, decoration, or outdoor structures, etc. was performed relying on sensitivity of a chooser. Therefore, selecting harmonious colors was, in some cases, difficult.

SUMMARY OF THE INVENTION

One object of the present invention is to provide color cards that allow the user to roughly select a color card showing a color tone suited for being applied to an object to be painted based on the lightest color tones in the respective color cards, and to select one of color tones shown in the selected color card.

Another object of the present invention is to provide color cards that allow the user to select one color card based on one of basic, auxiliary and emphatic color samples in the respective color cards, and to easily select two or more colors from the plurality of color samples in the selected color card.

Further object of the present invention is to provide color cards that allow the user to easily select a color in view of colors of the neighboring objects so that the colors of the neighboring objects and the object to be painted have unity and are well-organized.

Still another object of the present invention is to provide a harmoniously colored picture and the colors which constitute the colored picture so that it is easy for the user to select a combination of colors, upon color planning for an object to be painted.

In order to attain the above objects, one aspect of the present invention provides a color card which comprises at least three color samples, and among the color samples, a light color sample expressing the lightest color occupies a larger space than the color samples expressing the other colors.

By providing plural number of such color cards, the user can roughly select a color card showing a color tone suited for being applied to an object to be painted based on the light color samples and then select one of the color samples shown in the selected color card.

It is preferable that a deep color sample expressing the deepest color is arranged on one side of the light color sample, and a neutral color sample expressing a neutral color which stands between the light color sample and the deep color sample on the other side thereof, in the aforementioned color card.

Such a color card provides a simple manner of comparison between the light color sample and the other color samples, and makes it easy for the user to select a color which matches an image.

One color card may comprise a plurality of deep color samples and/or neutral color samples, which respectively constitute a deep color display portion on one side of a light color sample and/or a neutral color display portion on the other side of the light color sample. The light color sample occupies a larger space than the color samples expressing the other colors. The deep and/or neutral color samples express deeper colors in the respective color display portions as they are farther from the light color sample.

Use of the aforementioned color card allows indication of many color tones in one color card. The user can roughly select one color card from the plurality of color cards based on the light color samples, and then select a deeper color tone which matches an image in the selected color card.

A color book of the present invention comprises a plurality of color cards as mentioned above. This color book is easy to carry, and expands a range of choices for colors.

It is preferable that the plurality of color cards are classified into groups by impressions received from one of colors of the light, deep and neutral color samples in the respective color cards.

The color book as mentioned above allows the user to select a group of color cards according to the impression received from an imaged color tone, thus expedites selection of a color.

It is preferable that the color book is a collection of a plurality of grouped color books.

Use of such color books helps the user to narrow down color tones to a certain degree by the impression even if the user does not have a particular image in mind beforehand. The user can select a group at first, then roughly select one color card based on the plurality of light color samples, and finally select one of colors which matches the image from the color tones shown in the selected color card in an efficient and appropriate manner.

Another aspect of the present invention provides a color card comprising at least three color samples. The at least three color samples include a basic color sample expressing a basic color, an auxiliary color sample expressing an auxiliary color and an emphatic color sample expressing an emphatic color. The basic color is a key color of the color card. The auxiliary color is a color that introduces changes to the basic color. The emphatic color is a color that can strengthen the overall impression of the color card. One color card may comprise one or more samples for the aforementioned respective color samples. The basic color sample expressing the basic color occupies a larger space than the samples expressing the other colors. The emphatic color sample expressing the emphatic color occupies the smallest space.

By providing a plurality of the aforementioned color cards, the user can select a color card based on one of the basic, auxiliary and emphatic color samples, and then select two or more colors from a plurality of color samples in the selected color card or select a color which may be in line with the neighboring objects of an object to be painted. Accordingly, unity is produced between the two or more colors or the colors of the neighboring objects and the object to be painted.

It is preferable that the basic, auxiliary and emphatic color samples are arranged side by side in the color card. The basic color sample is arranged in the middle part of the color card, the auxiliary color sample is arranged on one side of the basic color sample, and the emphatic color sample is arranged on the other side of the basic color sample.

The color card as above allows the user to view the auxiliary and emphatic colors corresponding to the basic color, and select colors which are well-organized in connection with the basic color.

It is preferable that the color card comprises one basic color sample, and two or more of the respective auxiliary and emphatic color samples.

Then, it is possible to obtain an attractive and well-organized color card comprising many samples which are nicely arranged based on the basic color sample.

It is preferable that the basic, auxiliary and emphatic color samples have the same hue but different brightness and/or saturation. Such a color card is much more superior in unity.

It is preferable that a color book of the present invention comprises a plurality of the aforementioned color cards. This color book offers the user a wide range of choices for colors.

It is preferable that the color cards in the color book are classified into groups by impression received from one of colors of their basic, auxiliary and emphatic color samples.

The color book as mentioned above allows the user to select a group of color cards according to a color imaged in advance, thus expedites selection of colors.

It is preferable that the color book is a collection of a plurality of grouped color books.

Use of such color books helps the user to narrow down colors to a certain degree by the impression even if the user does not have a particular image in mind beforehand. The user can select a group at first, then roughly select one color card based on the plurality of light color samples, and finally select one of colors which matches the image from the color tones shown in the selected color card in an efficient and appropriate manner.

Further another aspect of the present invention provides a color card comprising a colored picture and a plurality of painted samples corresponding to a plurality of colors which constitute the colored picture.

This color card is advantageous in that the colored picture helps the user to select harmonious colors, compared to the conventional color card that only shows painted samples by a color system order.

It is preferable that the colored picture depicts nature, figures, artificial objects, or combination of the foregoing. Such pictures are familiar and strike the right chord.

It is also preferable that the colored picture is a photo. The user can find such a picture more particular and familiar. This helps the user to select colors.

It is preferable that the painted samples express basic, auxiliary and emphatic colors. These painted samples produce variation as well as harmony in colors.

A color book in the present aspect of the invention may comprise plural sets of colored picture and plurality of painted samples arranged in a sheet of cardboard or a series of cardboards. This color book is easy to carry, bringing the plurality of color samples together, and simplifies a comparative review of color combination.

It is preferable that basic colors of the colored pictures in the color book have the similar color tones.

The painted samples classified by the colors, seasons in a year, etc. can be arranged in a sheet of cardboard or a series of cardboards. It is easy for the user to select colors based on the grouped color books.

BRIEF DESCRIPTION OF THE DRAWINGS

The invention will now be described, by way of examples, with reference to the accompanying drawings, in which.

DETAILED DESCRIPTION OF PREFERRED EMBODIMENT

First Embodiment

Figure 1:
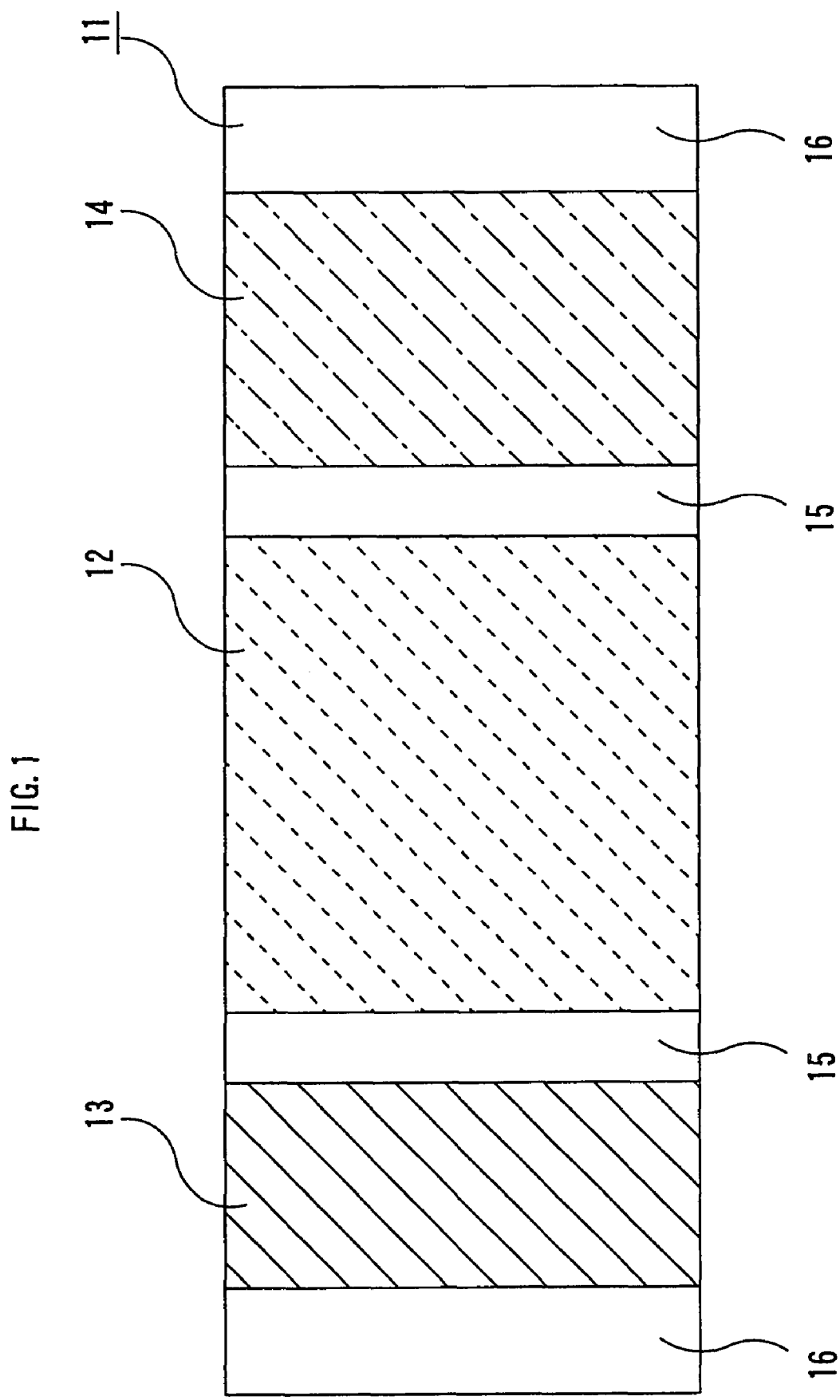
FIG. 1 illustrates an example of a color card according to a first embodiment of the present invention.

The present embodiment provides a color card showing at least three color samples side by side. Among the color samples, a light color sample expressing the lightest color tone occupies a larger space than the color samples expressing the other color tones.

This color card is used for selecting and checking the color tone of paint after dried. In other words, it is for selecting and checking the color tone obtained by coating an object with paint.

It is not necessary to show plural color tones in one color card when checking whether the obtained color is the same as the color selected before coating. However, assuming that selection of a color tone is performed before the coating, if the color card shows only one color sample, a large number of color cards are required compared to a case in which one color card shows a plurality of color samples.

The color card described in the present embodiment is mainly for selecting a color tone before coating. Therefore, it is preferable that the color card comprises a plurality of color samples and it is necessary that at least three color samples are shown in one color card. By providing at least three color samples, it is possible to show colors with the same hue but different brightness. In other words, it is possible to show deep, light and neutral colors with the same hue in one color card.

The color, for example, is expressed by hue, brightness and saturation. The hue represents difference in colors such as red, blue and yellow. The color having no color is called achromatic color. The examples of the achromatic color are white, black and gray. The color having a color like red, blue, yellow, etc. is called chromatic color.

Principally, the difference between lightness and deepness in color is affected by the brightness and saturation. The brightness represents how strong the color is, and the saturation represents how pure the color is. A color tone with low brightness is blackish, and a color tone with high brightness is whitish. A color tone with low saturation is somber, and a color tone with high saturation is vivid.

The impression of a color may be represented by a color tone, which is generated by joining concepts of brightness and saturation. The color tone is varied as the brightness and saturation are modified. The color tone largely affects deepness and lightness in color.

In the present embodiment, a color is firstly distinguished by the level of brightness. A color with low brightness is regarded as a deep color. A color with high brightness is regarded as a light color. In case that there are colors with the same level of brightness, the level of saturation is used for distinction. That is, a color with low saturation is regarded as a deep color, and a color with high saturation is regarded as a light color.

When creating a color card, the number of colors to be shown in one color card must be determined. Among the colors to be shown, a color with the highest brightness is set to be a light color sample, and a color with the lowest brightness is set to be a deep color sample. In case that there are colors with the same brightness, a color with the lowest saturation is set to be a deep color sample, and a color with the highest saturation is set to be a light color sample. The neutral color is set to be a neutral color sample. The neutral color sample can be arbitrarily set as long as it has the color tone standing between the light color sample and the deep color sample.

Among the plurality of the color samples shown in one color card, the light color sample expressing the lightest color occupies a larger space than the color samples expressing the other colors. Accordingly, accurate selection of a color which matches a desired image is possible. In other words, the user can roughly choose one color card showing a color tone which is close to the image based on the light color samples at first. Then, the user chooses one of color tones in the selected color card which appears to be the closest to the image.

Comparison between the color tones can be easy if selection of a color tone close to the image is performed based on the deep color samples. However, in most cases, it is difficult to select a lighter color tone than the selected one, when a deep color which makes a strong impression is chosen at first. On the contrary, if a color tone close to the image is selected based on the light color samples, a range of choices for colors is expanded, while it may become a little difficult to distinguish the difference between the color tones. This is because it is easier to distinguish deep colors than light colors.

There is an advantage to select a color tone close to a desired image based on the light color samples, since in many cases, a light color is preferred for use in structures like buildings in view of the surrounding environment.

In addition, among the plural color samples shown in the color card, the light color sample compares poorly with the deep and neutral color samples since it is likely to be affected by the other colors due to the lightness in color tone. Therefore, it is difficult to select a light color sample. Relatively expanding the space for the light color sample in the color card can prevent the light color from being substantially affected by the colors of the other color samples.

It is further preferable that the space for the neutral color sample is larger than the space for the deep color sample. This helps creating a color card in which the neutral color is less affected by the deep color.

When selecting a color, it is preferable to select a color tone which is deeper than the color tone to be applied to a building, etc., by about one level. This is because when applying a color tone to a large space in the building, etc., the selected color tone appears to be lighter than the same color tone shown in a small space like a color sample.

Now, the color card of the present embodiment is explained in detail by way of drawings.

It is preferable that the color card of the present embodiment is in a rectangular form. This rectangular form enhances efficiency in creation, storage, and transport of the color card. A color sample can take any forms, but a rectangular form is preferred. The rectangular color samples clarify how much space is occupied by the respective color samples. Also, they can be arranged on the rectangular color card in an efficient manner.

FIG. 1 shows an example in which rectangular color samples are arranged on a rectangular color card. In the middle part of the color card 11, a light color sample 12 having a larger space than the other color samples is arranged. On one side of the light color sample 12, a deep color sample 13 is arranged, and on the other side thereof, a neutral color sample 14 expressing a neutral color between the light color and the deep color is arranged. The neutral color sample 14 occupies a larger space than the deep color sample 13.

Plural color cards 11 are provided. Firstly, the user roughly chooses one color card 11 including a color tone which is close to an image based on the light color samples 12 having a larger space. There are at least three color samples in the selected color card 11, that is, deep color sample 13, neutral color sample 14 and light color sample 12, out of which a color which matches the image is chosen.

Figure 2:
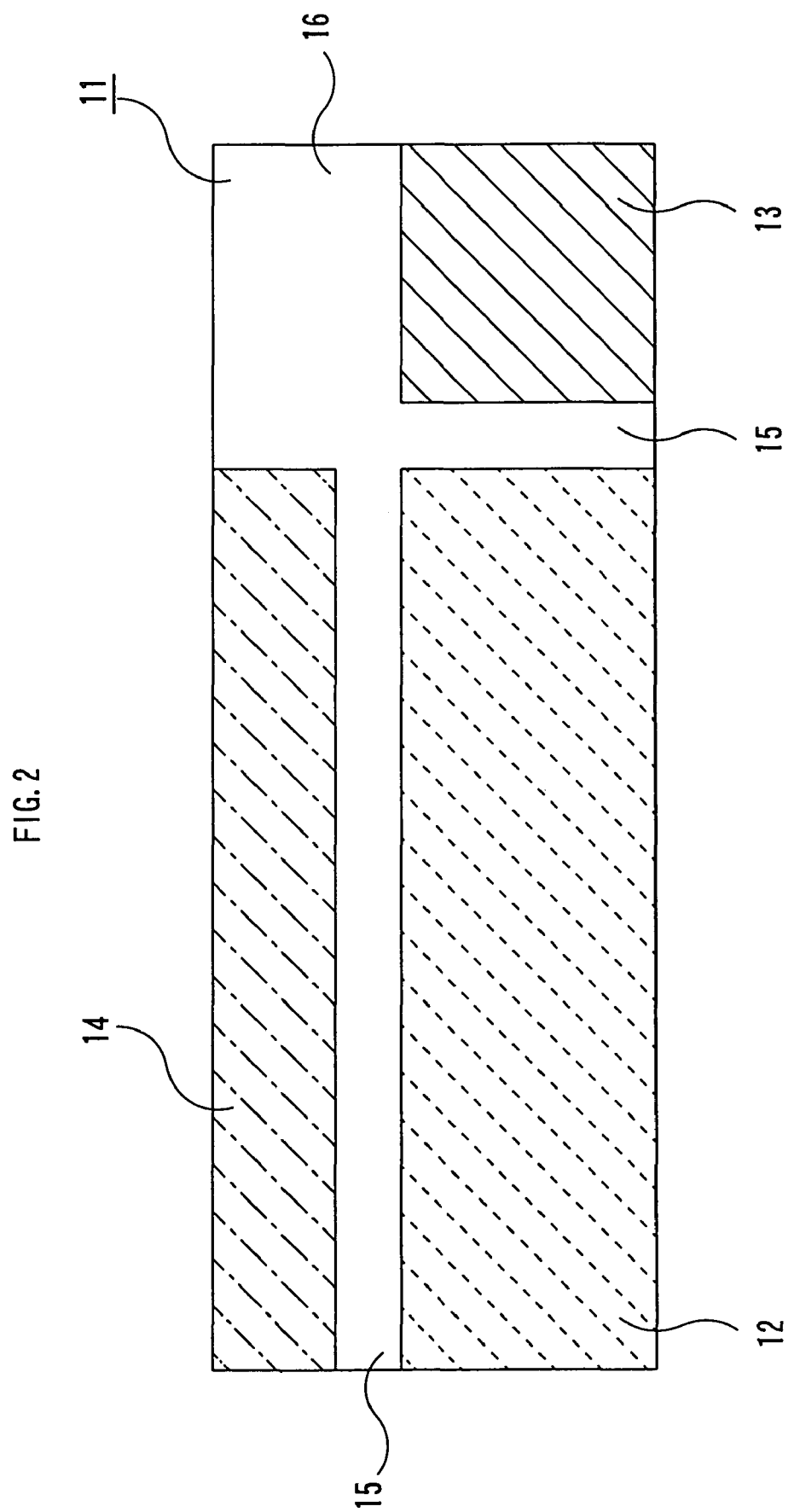
FIG. 2 illustrates an example of a color card according to the first embodiment.

The arrangement of the color samples is not limited to the one shown in FIG. 1, and arrangement as shown in FIG. 2 is also possible, as long as the light color sample 12 is arranged in the middle part. In this manner, comparison between the light color sample and the other color samples may be performed simple, allowing the user to easily select a color which matches the image.

It is preferable to provide a gap 15 between the respective color samples. Provision of the gap 15 clarifies the boundaries between the respective color samples, and allows the user to easily distinguish different colors displayed in the color card. The color of the gap 15 can be any color, as long as it is not a color which appears on the same color card. White, which has no lightness and deepness in color, is preferred. Transparent color can be used as well.

It is preferable to provide a blank part 16 in an end of the color card. The blank part 16 in the end can be used as a part to be touched by hand. Thereby, it is possible to handle the color cards without touching the color samples in the color cards. Frequent touches to the color cards may dirty the color samples and cause changes in colors.

The blank part 16 can be useful when binding plural number of color cards. By using the blank part 16 as a binding margin of the color cards, binding the color cards without damaging the color samples can be achieved.

It is preferable that there are at least two such blank parts 16. Then, one of the blank parts 16 can be used for creating a color book which binds plural number of color cards, while the other of the blank parts 16 is used for handling the color cards.

Figure 3:
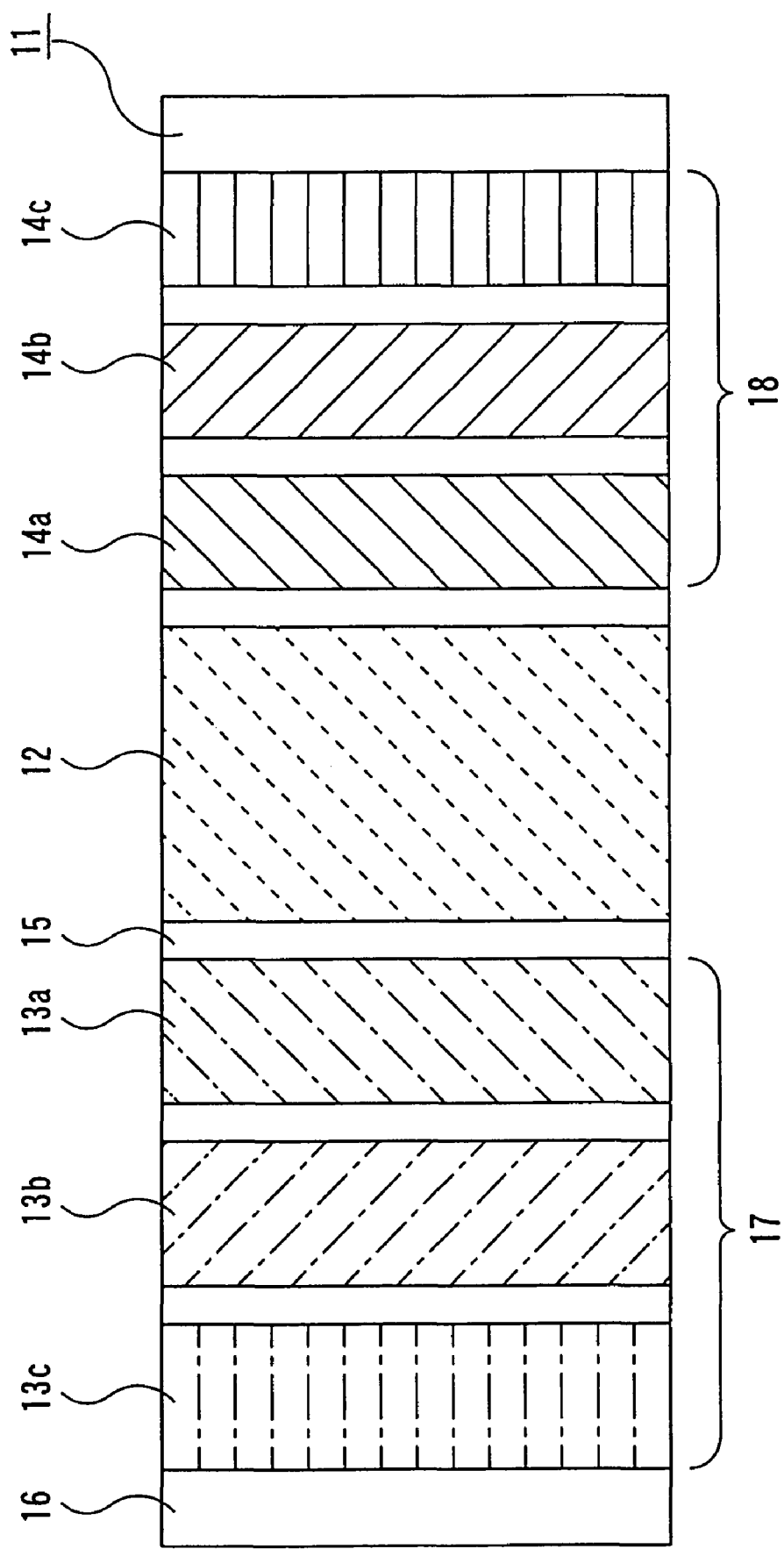
FIG. 3 illustrates an example of a color card according to the first embodiment in which a deep color display portion and a light color display portion are formed.

FIG. 3 shows a color card comprising a deep color display portion 17 and a neutral color display portion 18, in which deep color samples 13a–13c and neutral color samples 14a–14c are respectively arranged.

A color sample expressing the lightest color among seven colors shown in this color card is set to be a light color sample 12. The color sample expressing the deepest color is set to be the deep color sample 13c, and the color sample expressing a neutral color is set to be the neutral color sample 14c. The neutral color sample 14c and the colors stand between the neutral color sample 14c and the light color sample 12 are arranged in the neutral color display portion 18. The colors standing between the neutral color sample 14c and the light color sample 12 are referred to as neutral color samples 14a and 14b. The deep color sample 13c and the colors stand between the deep color 13c and the neutral color sample 14c are arranged in the deep color display portion 17. The colors standing between the deep color sample 13c and the neutral color sample 14c are referred to as deep color samples 13a and 13b.

The deep color display portion 17 comprises three color samples of the deep color samples 13a–13c. Among the three color samples, the deep color sample 13a adjacent to one side of the light color sample 12 expresses the lightest color in the deep color samples 13a–13c inside the deep color display portion 17.

The color expressed by the deep color sample 13b adjacent to the deep color sample 13a is deeper than the color of the deep color sample 13a and lighter than the color of the deep color sample 13c. The deep color sample 13c has the deepest color in the deep color samples 13a–13c. That is, in the deep color display portion 17, the farther from the light color sample 12, the deeper the color of the deep color samples 13a–13c.

The neutral color display portion 18 comprises three color samples of the neutral color samples 14a–14c. Among the three color samples, the neutral color sample 14a adjacent to the other side of the light color sample 12 expresses the lightest color in the neutral color samples 14a–14c inside the neutral color display portion 18.

The color expressed by the neutral color sample 14b adjacent to the neutral color sample 14a is deeper than the color of the neutral color sample 14a and lighter than the color of the neutral color sample 14c. The neutral color sample 14c has the deepest color in the neutral color samples 14a–14c. That is, in the neutral color display portion 18, the farther from the light color sample 12, the deeper the color of the neutral color samples 14a–14c.

In the color card 11 shown in FIG. 3, the deep color samples expressing deep colors are arranged on one side of the light color sample 12, and the neutral color samples expressing neutral colors between the light color and the deep color are arranged on the other side thereof. The light color sample 12 occupies a larger space than the other color samples. There are plural number of deep color samples 13a–13c and neutral color samples 14a–14c, which constitute the deep color display portion 17 and neutral color display portion 18, respectively. The farther from the corresponding side of the light color sample, the deeper the color inside the respective deep color display portion 17 and neutral color display portion 18. This means that the colors expressed by the color samples become gradually deep toward the ends from the middle part of the color card 11 where there is the light color sample 12. Such a color card is eye-friendly, and prevents redundancy of the color samples.

With the color card mentioned as above, it is possible to show plural color tones on one color card.

In addition, the user can roughly choose a color card 11 including a color tone which is close to the image out of the plural color cards 11, based on the light color samples 12 with the largest space at first. Then, the user can select a deeper color tone than the color tone expressed by the light color sample 12 in the color card 11 in turn. Thereby, appropriate selection of the color which matches the image can be achieved.

Figure 4:
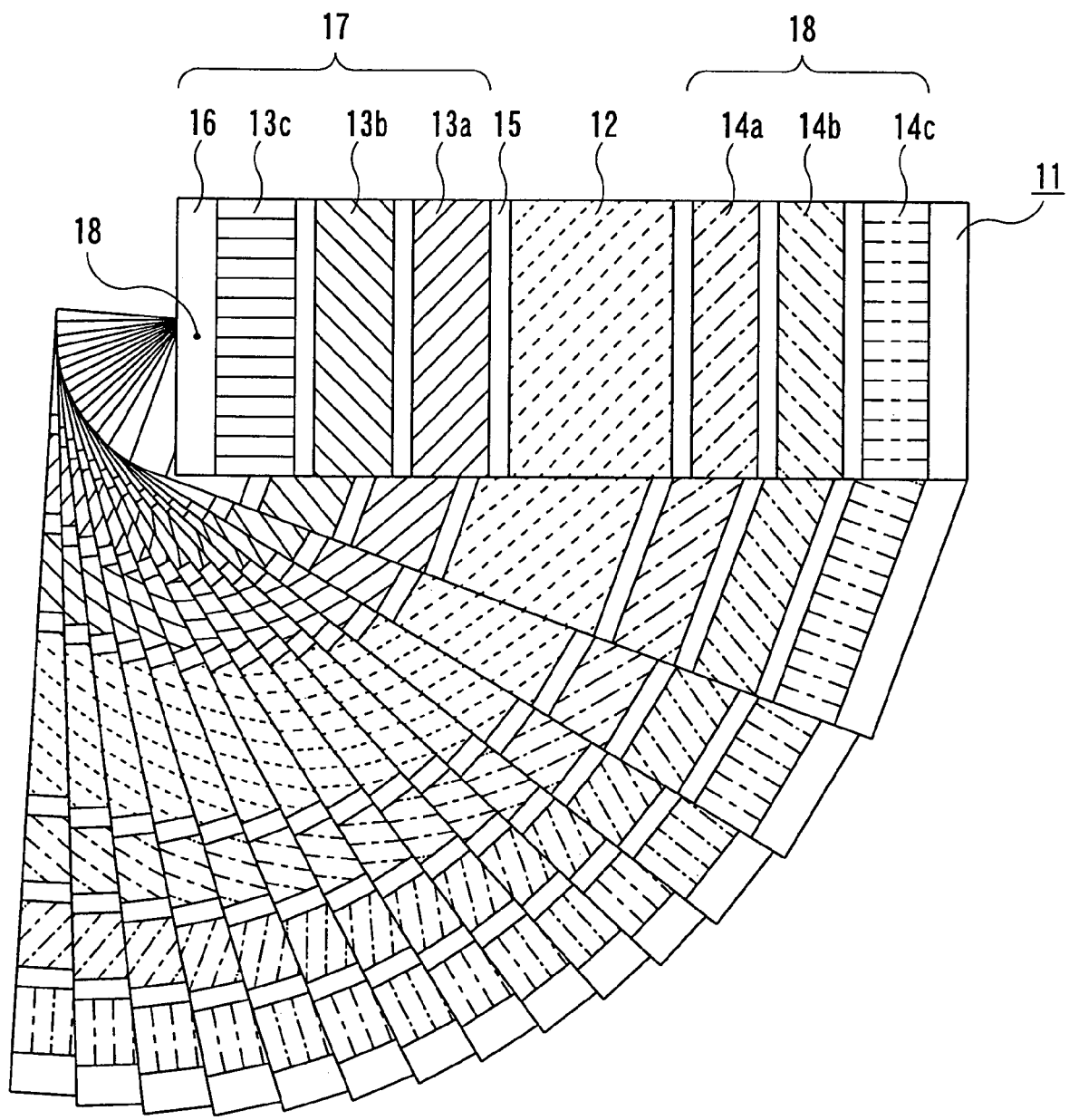
FIG. 4 illustrates a color book comprising a plurality of color cards shown in FIG. 3.

FIG. 4 shows a color book comprising a plurality of color cards 11 in FIG. 3.

This color book comprises the color cards 11 bound by a stopper 19. Such a color book enhances portability of plural color cards and also allows easy selection of a color from plural color tones.

In the color book shown in FIG. 4, the stopper 19 is positioned approximately in the middle of the blank part 16 in one end of the color card. The stopper 19 can be positioned anywhere as long as it is within the blank part 16. Thereby, the color samples are prevented from damages which may result from the binding.

In addition, binding at one position allows the color cards 11 to fan out as shown in FIG. 4. Viewing of the color cards becomes easy, and the manner of color selection is simplified.

It is preferable that the color cards which constitute a color book are classified into groups by impressions received from the colors indicated by one of the light color samples, deep color samples and neutral color samples.

Such grouping may expedite color selection. This grouping can be performed, for example, per types of hues such as red, blue, etc., per atmospheres created by the colors such as natural, modern, classic, etc., or per brightness in color tones such as neutral, somber, bright, etc.

Providing a color book comprising color cards grouped per impressions received from colors as above allows the user to select a color by the impression received from an imaged color tone and expedites color selection.

It is further preferable that a color book is a collection of the aforementioned grouped color cards. Such a color book is advantageous to the user who has no specifically imaged color tone. Since more color tones are collected and grouped per impressions, the user can first select a group to narrow down the color tones by the impressions, roughly select one color card based on the light color samples in the color cards in the selected group, and then select a color from the color samples in the selected color card.

The above grouped color books, for example, may be in the form of one color book binding the respective grouped color books with a stopper or the like, or may be packed into a container all together. The user can arbitrarily choose a preferred form.

Second Embodiment

The present embodiment provides a color card displaying at least three color samples side by side. The color samples express a basic color which is a key color of the color card, an auxiliary color which can introduce changes to the basic color and an emphatic color which can strengthen the impression of the overall color card. The color card comprises one or more of the respective color samples. The basic color sample expressing a basic color occupies a larger space than the color samples expressing the other colors. The space occupied by the emphatic color sample is the smallest.

Similar to the color card in the previous embodiment, the color card described in the present embodiment is mainly for selecting a color tone before coating. Therefore, it is preferable that the color card comprises a plurality of color samples and it is necessary that at least three color samples (basic color, auxiliary color and emphatic color) are shown in one color card. By arranging at least three color samples, it is possible for one color card to offer the impression of unity and comfort.

The basic color is a key color of a color card. According to the basic color, later described auxiliary color and emphatic color are determined. The basic color is important, by which the impression or image of the overall color card is determined.

The basic colors of the color cards are generally determined depending on the type or use of an object to be painted. Since this color card is mainly for selecting a color obtained after painting external walls, internal walls, ceilings, etc. of structures such as buildings, it is preferable that the basic colors are comfortable colors generally applied to buildings.

The colors generally applied to buildings are in many cases light. If deep colors or primary colors like red or blue are applied to the external walls of buildings, it is difficult to bring the buildings into line with the surrounding environment. Therefore, such colors are hardly applied. Similarly, even if such colors are used on the internal walls or ceilings, there is not much furniture which matches up well. The space created by such walls or ceilings may be too dark or too bright, and it is not comfortable. Accordingly, it is preferable that the basic colors are light.

The auxiliary color is a different color from the basic color. The auxiliary color can introduce changes to the basic color, and is determined according to the basic color. For example, if the basic color is a light color, the auxiliary color may be a deeper or darker color than the basic color. On the contrary, if the basic color is a deep color, the auxiliary color may be a lighter or brighter color than the basic color.

It is preferable that the auxiliary color has the same hue as or has a close hue to the basic color. Adopting such hues can produce unity in a color card.

The emphatic color is a color different from the basic color and the auxiliary color. The emphatic color is a color that strengthens the impression of the overall color card. The emphatic color is determined based on the basic color and the auxiliary color.

This emphatic color is used to put the accent in the color card. Therefore, if the basic color in the color card is a light color, the emphatic color may be a color deeper or darker than the basic color and the auxiliary color. On the contrary, if the basic color in the color card is a deep color, the emphatic color may be a color lighter or brighter than the basic color and the auxiliary color. Furthermore, the emphatic color may be a contrastive color to the basic color and the auxiliary color.

It is further preferable that the basic color sample, auxiliary color sample and emphatic color sample have the same hue, but have different brightness and saturation. The definition of the terms: hue, brightness and saturation has been made in the previous embodiment. Therefore, explanation of these terms is not repeated. In case that the basic color sample, auxiliary color sample and emphatic color sample with different hues are combined, the resultant color card may appear to lack unity. However, if the respective color samples have the same hues but different brightness, saturation or color tone, the resultant color card will appear well-organized.

A color card may comprise one or more colors of the respective basic, auxiliary and emphatic colors as described above.

However, if there is more than one basic color, it is necessary to provide the auxiliary and emphatic colors corresponding to the respective basic colors. This may result in complicated arrangement of the color samples in one color card, and selection of a color becomes difficult.

For this purpose, it is preferable that one color card comprises only one basic color sample, and at least two auxiliary and emphatic color samples, respectively, corresponding to the basic color. By providing a plurality of auxiliary and emphatic colors for one basic color, it is possible to obtain a color card in which plural color samples are nicely arranged with unity, based on the basic color.

It is preferable that the number of the respective auxiliary and emphatic colors to one basic color is two or more. Since selection of a color is likely to be difficult if there are too many auxiliary and emphatic color samples, the number of the respective auxiliary and emphatic color samples is preferably in a range of 2–5. Selection of a color is easy if the number of color samples falls within this range.

This basic color is a key color of the color card. It generally occupies the most part of an object to be painted. Therefore, it is necessary that a space of the basic color sample expressing the basic color is larger than spaces of the color samples expressing the other colors in the color card. In addition, the emphatic color which is used for putting the accent in the color card generally occupies a small part in the object to be painted. Therefore, it has the smallest space among the color samples of the color card.

The color offers a different impression depending on the space in which it is used. That is, a bright, vivid color is likely to make a brighter and more vivid impression as the space used becomes large, and a dark, somber color is likely to make a darker and more somber impression as the space used becomes large.

Accordingly, it is necessary that the space of the basic color sample expressing the basic color is larger than the spaces of the color samples expressing the other colors in the color card. Thereby, it is possible to make the impression of the basic color similar to the impression which may be received after the object to be painted is actually given color.

Since the basic color sample occupies a larger space than the color samples expressing the other samples among the plural color samples shown in the color card, it is possible for the user to properly choose a color which will take the most part of the object to be painted and which matches the desired image, without being affected by the colors of the other color samples.

Since colors to be adopted for use in buildings are in many cases light colors, the basic colors in the color cards will be also light colors. In other words, the color samples other than the basic colors are to be deeper colors than the basic colors.

In this case, the lightest color in the plural color samples shown in the color card is the basic color. The light-colored basic color sample may be affected by the colors of the other color samples, and it may compares poorly. Relatively expanding the space of the basic color sample in the color card can prevent the basic color from being affected from the colors of the other color samples.

The auxiliary color is a different color from the basic color as described in the above. It is a color that can introduce changes to the basic color. In other words, it is a color that gives changes in color to an object painted or to be painted with the basic color.

The auxiliary color is to occupy a smaller space in the object than the basic color. Accordingly, it is necessary that the auxiliary color sample in the color card is relatively small to the basic color sample.

In addition, the auxiliary color generally has a deeper or darker color tone than the basic color. Therefore, in order to reduce the effect on the basic color and not to compare favorably, it is necessary that the auxiliary color sample occupies a smaller space than the basic color.

The emphatic color is a color different from the basic color and the auxiliary color as described above. It is a color that strengthens the impression of the overall color card. Similar to the auxiliary color, the emphatic color is a color that puts an accent on the object painted or to be painted with the basic color.

The emphatic color is to occupy a smaller space in the object than the basic color or the auxiliary color. Thereby, it is necessary that the emphatic color sample in the color card is smaller than the basic and auxiliary color samples. That is, it occupies the smallest space among the color samples in the color card.

The emphatic color generally has a deeper or darker color tone than the basic or auxiliary color. Therefore, in order to reduce the effect on the basic color and the auxiliary color and not to compare favorably, it is necessary that the emphatic color sample occupies a smaller space than the basic and auxiliary colors.

The basic color sample, auxiliary color sample and emphatic color sample in the aforementioned color card allow the colors of the object to be painted, or of the object and the neighboring object, to be well-organized.

The basic color occupies or is to occupy 50–80% in the object to be painted or in a space where the object is settled. The auxiliary color occupies 15–35%, and the emphatic color occupies 5–15% in the object to be painted or in a space where the object is settled.

Taking the exterior of a building for instance, and assuming that the basic color is represented by the color of the external walls, the auxiliary colors may correspond to the colors of fittings like window frames, doors, eaves or roofs, and the emphatic colors may correspond to the colors of gates and fences. Or, the external walls may be composed of the basic and auxiliary colors within the aforementioned range, and the emphatic colors may be used to the fittings like window frames, doors, eaves and roofs.

Considering the exterior of the building in a space, the color in the nature such as the sky and ocean, or the color of the neighboring structure may represent the basic color. The color of the external walls of the building may be selected from the auxiliary colors, and the emphatic colors may be used as the colors of the gates and fences.

In case of the interior of the building or car and train where there is a living space, the basic color may be used for the walls and ceilings, the auxiliary colors may be used for the furniture like chairs and electric appliance, and the emphatic colors may be used for the interior goods.

The use of the color card is not limited to selection of colors for buildings and living spaces. For example, taking a car for instance, the basic color may be used for the body, the auxiliary color may be used for the bumper, and the emphatic color may be used for the portion around the windows at choice. In case of a chair, the basic color may be used for the seat and back, the color of the arms may be chosen from the auxiliary colors, and the color of the legs may be chosen from the emphatic colors.

Now, arrangement of the basic, auxiliary and emphatic color samples in the color card of the present embodiment is described in detail by way of drawings.

Figure 5:
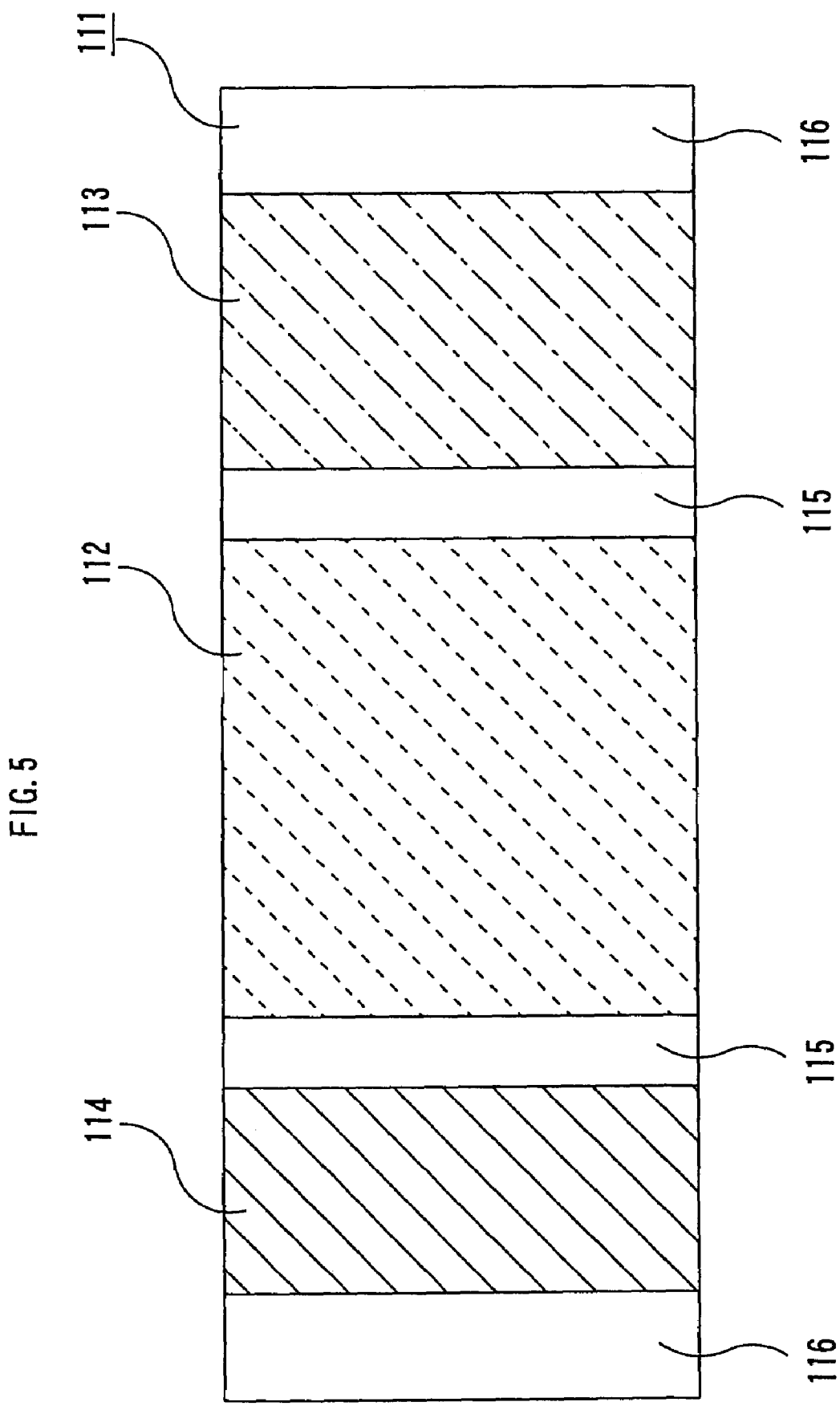
FIG. 5 illustrates an example of a color card according to a second embodiment of the present invention.
Figure 6:
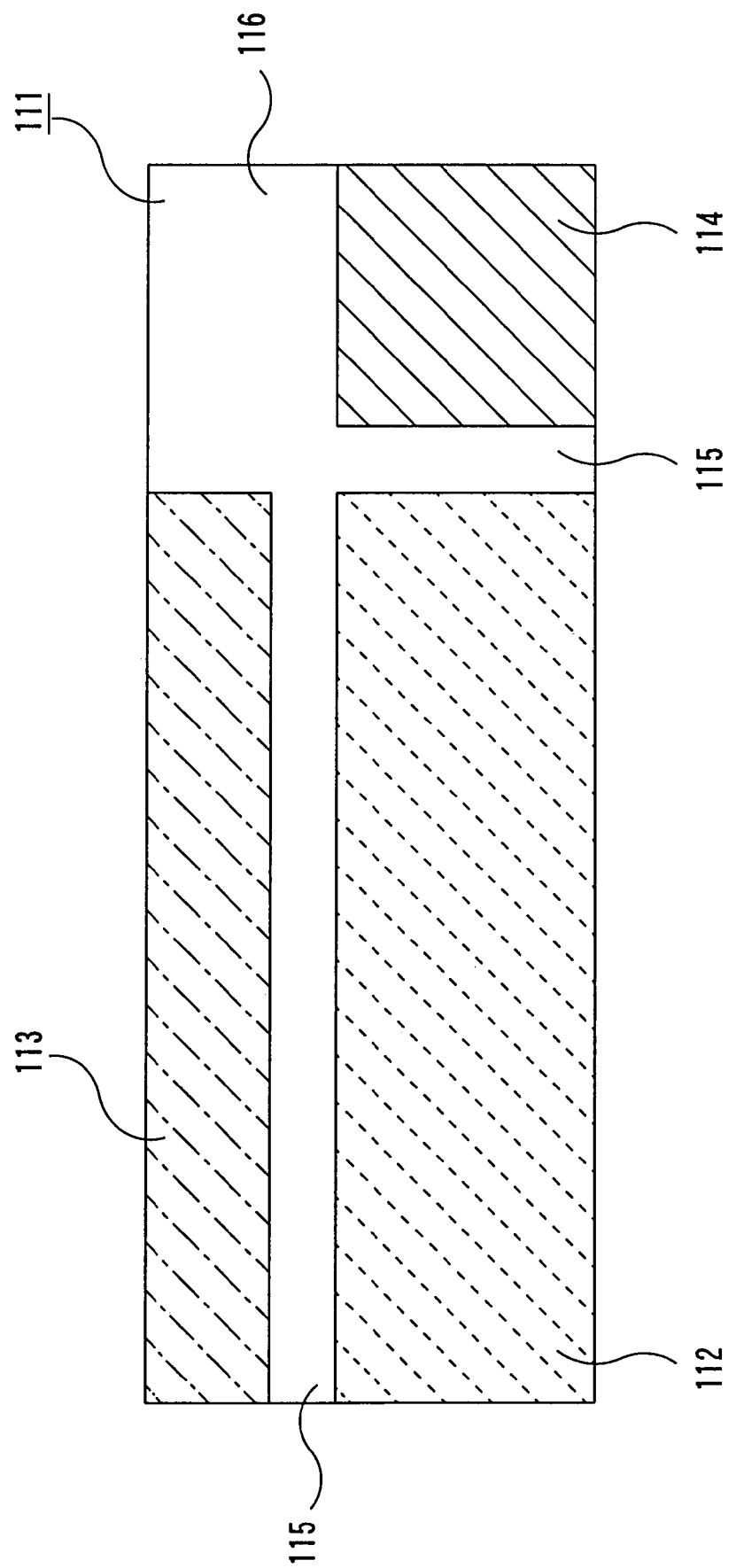
FIG. 6 illustrates an example of a color card according to the second embodiment.

FIGS. 5 and 6 show examples of a color card according to the present embodiment, which is referred to as color card 111. The color card 111 comprises three color samples, namely, basic color sample expressing a basic color, auxiliary color sample expressing an auxiliary color and emphatic color sample expressing an emphatic color, respectively. The basic color sample 112 expressing the basic color occupies a larger space than the color samples expressing the other colors. The emphatic color sample 114 expressing the emphatic color occupies the smallest space.

It is preferable that the color card of the present embodiment is in a rectangular form. This rectangular form enhances efficiency in creation, storage, and transport of the color card. A color sample can take any forms, but a rectangular form is preferred. The rectangular color samples clarify how much space is occupied by the respective color samples. Also, they can be arranged on the rectangular color card in an efficient manner.

The color card shown in FIG. 5 comprises a basic color sample 112, an auxiliary color sample 113 and an emphatic color sample 114 arranged side by side. The basic color sample 112 is arranged in the middle portion of the color card 111. The auxiliary color sample 113 is arranged on one side of the light color sample, and the emphatic color sample 114 is arranged on the other side thereof. By arranging the basic color in the middle part of the color card, it is possible to select the auxiliary and emphatic colors corresponding to the basic color. Therefore, selection of harmonious colors is possible.

It is preferable to provide a gap 115 between the respective color samples. Provision of the gap 115 clarifies the boundaries between the respective color samples, and allows the user to easily distinguish different colors displayed in the color card. The color of the gap 115 can be any color, as long as it is not a color which appears on the same color card. White, which has no lightness and deepness in color, is preferred. Transparent color can be used as well.

It is preferable to provide a blank part 116 in an end of the color card. The blank part 116 in the end can be used as a part to be touched by hand. Thereby, it is possible to handle the color cards without touching the color samples in the color cards. Frequent touches to the color cards may dirty the color samples and cause changes in colors.

The blank part 116 can be useful when binding plural number of color cards. By using the blank part 116 as a binding margin of the color cards, binding the color cards without damaging the color samples can be achieved.

It is preferable that there are at least two such blank parts 116. Then, one of the blank part 116 can be used for creating a color book which binds plural number of color cards, while the other of the blank part 116 is used for handling the color cards.

Figure 7:
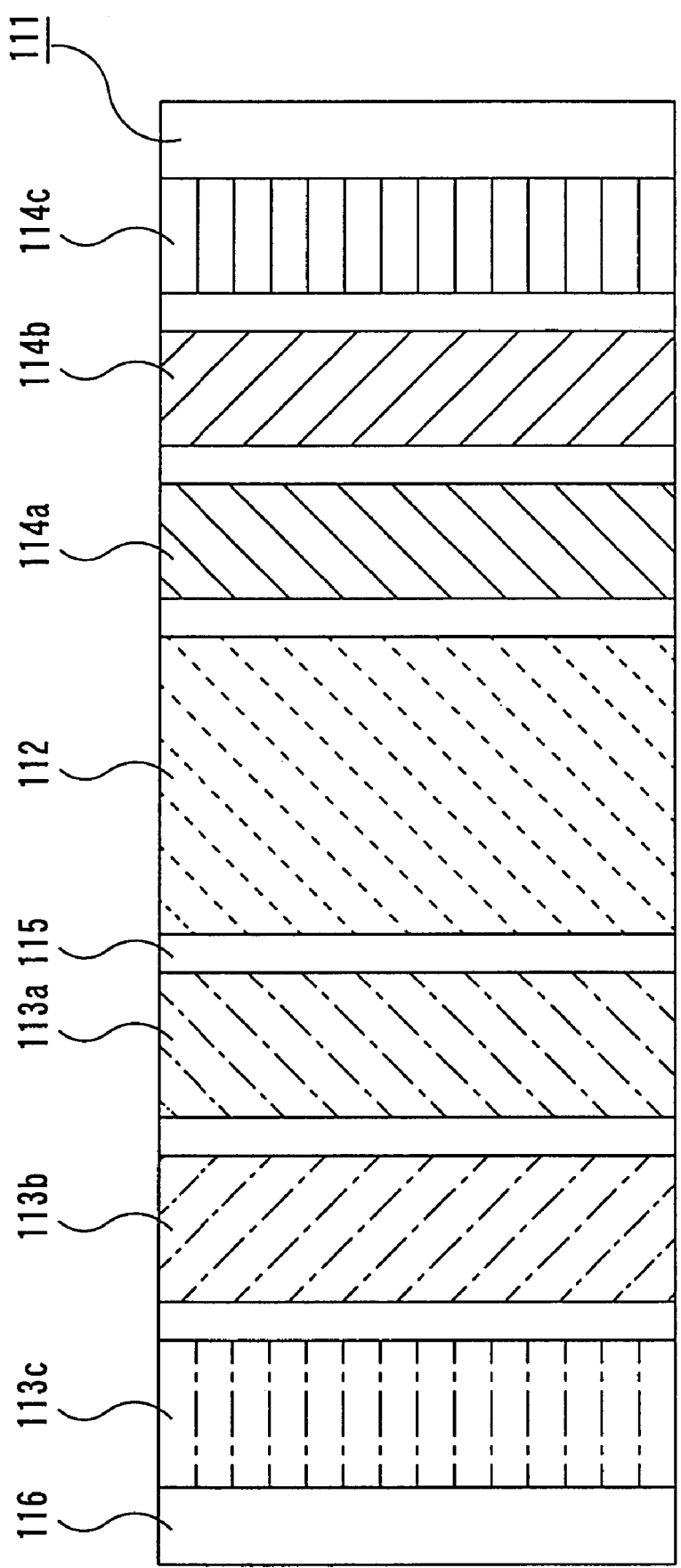
FIG. 7 illustrates another example of a color card according to the second embodiment.

FIG. 7 shows a color card 111 comprising the basic color sample 112 in the middle part of the color card 111, three auxiliary color samples 113a–113c on one side of the basic color sample 112, and three emphatic color samples 114a–114c on the other side of the basic color sample 112. The basic color sample 112 occupies a larger space than the color samples expressing the other colors, and the emphatic color samples 114a–114c comprise the smallest space.

By arranging the basic color sample 112 in the middle part of the color card, it is easier for the user to select plural number of auxiliary and emphatic colors corresponding to the basic color, which are harmonious to each other. Also, the color card 111 can comprise many color samples.

Generally, a plurality of color cards as described above are provided for selection of colors. Hereafter, a manner to use these color cards is explained.

When an object to be painted is to be coated with a paint of a basic color, a color card is selected from the plurality of color cards based on the basic color samples. Then, required colors are selected from the auxiliary and emphatic color samples in the selected color card.

When an object to be painted is to be coated with a paint of auxiliary or emphatic color, a color card is selected from the plurality of color cards based on the basic color samples. Then, a color for an object to be painted is selected from the auxiliary and emphatic color samples in the selected color card.

Considering the manner of use as described in the above, it is preferable to create a color book comprising a plurality of color cards.

Figure 8:
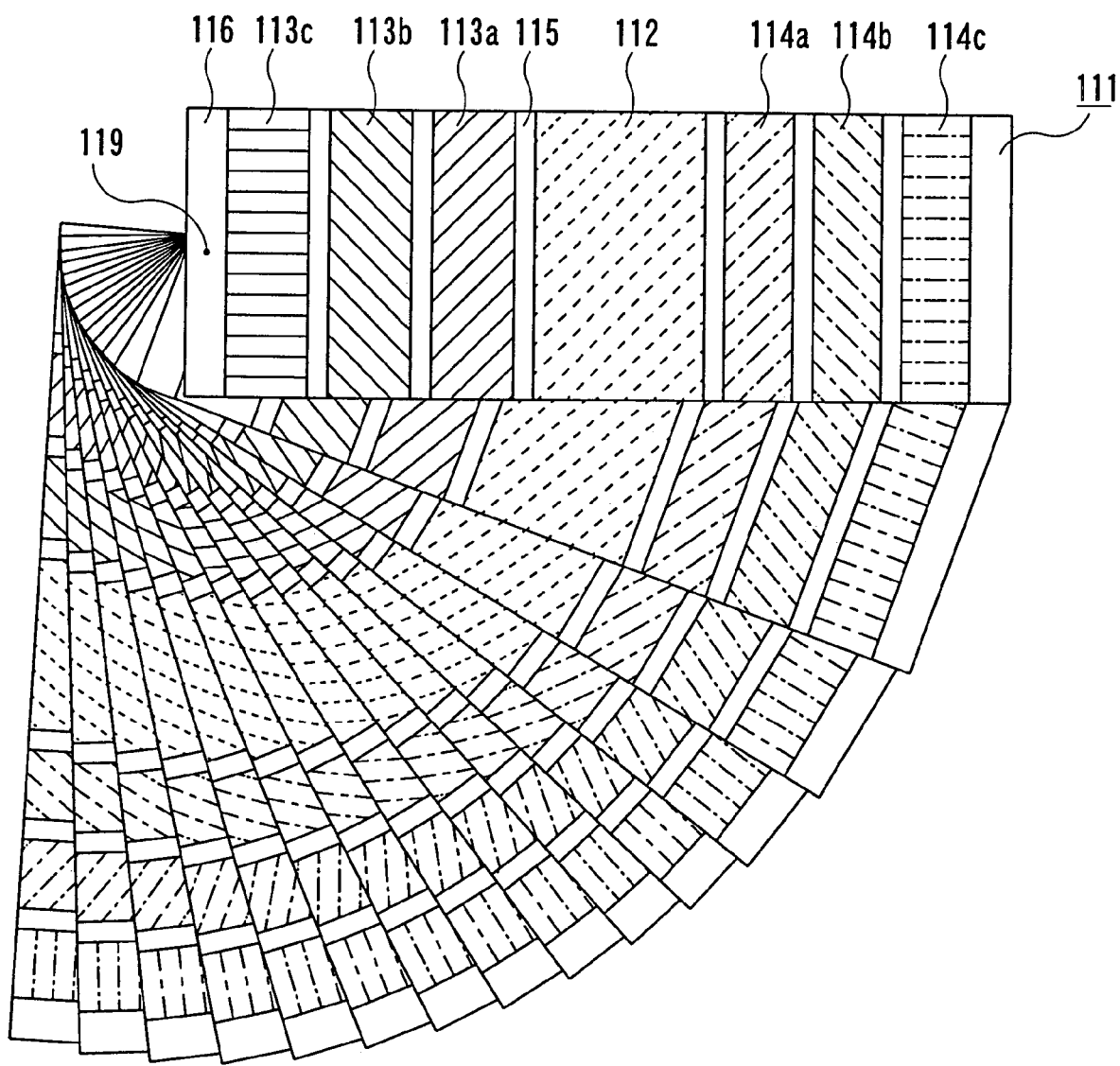
FIG. 8 illustrates a color book comprising a plurality of color cards shown in FIG. 7.

FIG. 8 shows a color book binding a plurality of color cards 111 shown in FIG. 7.

In this color book, the plurality of color cards 11 are bound by a stopper 119. Such a color book enhances portability of plural color cards and also allows easy selection of a color from plural colors. The stopper 119 prevents the color book from being scattered.

In the color book shown in FIG. 8, the stopper 119 is positioned approximately in the middle of the blank part 116 in one end of the color card 111. The stopper 119 can be positioned anywhere as long as it is within the blank part 116. Thereby, the color samples are prevented from damages which may result from the binding.

In addition, binding at one position allows the color cards 111 to fan out as shown in FIG. 8. Viewing of the color cards becomes easy, and the manner of color selection is simplified.

It is preferable that the color cards which constitute a color book are classified into groups by impressions received from the colors indicated by one of the basic color samples, auxiliary color samples and emphatic color samples.

Such grouping may expedite color selection. This grouping can be performed, for example, per types of hues such as red, blue, etc., per atmospheres created by the colors such as natural, modern, classic, etc., or per brightness in color tones such as neutral, dull, bright, etc.

Providing a color book comprising the color cards grouped per impressions received from colors as above allows the user to select a color by the impression received from the imaged color tone and expedites color selection.

It is further preferable that a color book is a collection of the aforementioned grouped color cards. Such a color book is advantageous to the user who has no specifically imaged color tone. Since more color tones are collected and grouped per impressions, the user can first select a group to narrow down the color tones by the impressions, roughly select one color card based on the light color samples in the color cards in the selected group, and then select a color from the color samples in the selected color card.

The collection of the grouped color books, for example, may be in the form of one color book binding the respective grouped color books with a stopper or the like, or may be packed into a container all together. The user can arbitrarily choose a preferred form.

Third Embodiment

Terms to be used in the present embodiment are explained hereafter.

A color card of the present embodiment comprises a picture which depicts nature, figures and artificial objects, together with a plurality of painted samples.

The picture which depicts nature in the present embodiment corresponds to views, including birds-eye views, insects-eye views, microscopic views, etc., of scenery such as mountains, rivers, woods, oceans and skies, as well as plants and animals. As to figures, dressed and naked persons, a body as a whole or any body part, a mass of people, etc. are all included. Persons can be in any posture like standing or lying, sitting on chairs, exercising, etc. Artificial objects include any industrial goods like machines, instruments, furniture, clothes, vehicles, ships, houses, buildings, structures, etc. They also include artifacts, paintings, photos and their replicas.

Such nature, figures and artificial objects may exist independently or in combination with each other. In either way, they can be utilized as sample pictures of the present embodiment. For example, the composition of a picture having persons in a natural scene produces a combination of figures and nature. Such a picture may be recognized as a sample picture of either nature or of figures, depending on which of the components constitutes the theme of the picture.

The paintings in the present embodiment include those of figures and scenery, or those created by imagination. Any available techniques such as water painting, oil painting, engraving, etching, screen printing, etc. can be used for creation of such paintings. Paintings are not suitable for industrial production, and thus, for use as picture samples of the present embodiment. The photos are more practical for use.

The photos in the present embodiment are those of nature, figures, artificial objects or a combination of the foregoing. They can be those taken by film or digital cameras, those printed to printed paper or copies of the printed photos.

The plurality of painted samples express colors corresponding to a plurality of colors which constitute the aforesaid picture sample. Accordingly, a black and white painting is not regarded as a picture in this case. There are variations in size and spatial relationship between the picture sample and painted samples. The size and spatial relationship can be determined at the disposal of the designers of the color card. In one of the following examples, a picture sample is arranged in an end and five painted samples are arranged in the remaining space in a rectangular color card. In another example, a picture sample is arranged at a position of one-third length of a rectangular color card from an end thereof. A painted sample expressing a basic color is arranged in one of the remaining space which is narrow, and four painted samples respectively expressing either auxiliary or emphatic colors are arranged in the other of the remaining space which is wide.

Two to six painted samples may be provided for one picture sample, preferably two to four painted samples for one picture sample. What colors are expressed in the respective painted samples is determined depending on how much space in the picture is occupied in total by the respective colors. Usually, the color occupying 50–80% in area in the picture is set to be a basic color, the color occupying 10–35% is set to be auxiliary colors, and the color occupying 1–15% is set to be emphatic colors. If the comparison by the occupying space is difficult, then a color having low brightness and/or saturation may be chosen as a basic color.

Generally, the basic color is a key color of the overall picture, the auxiliary colors are colors different from the basic color, and which introduce changes to the picture, and the emphatic colors are colors which strengthen the impression of the picture. It may be difficult to sort out colors which constitute a picture into three to six colors. However, if a basic color is selected, deeper or lighter colors than the basic color can be selected as the auxiliary colors. Ordinarily, if the basic color is a deep color, that is, having low brightness and/or high saturation, the auxiliary colors have higher brightness and/or lower saturation than the basic color. On the contrary, if the basic color is a light color, that is, having high brightness and/or low saturation, the auxiliary colors have lower brightness and/or higher saturation. In this case, the hue of the auxiliary colors is the same as, or is close to, the hue of the basic color.

The emphatic colors are colors which put the accent in the picture. Therefore, if the picture is constituted with the similar hues, the emphatic colors have lower brightness and/or higher saturation, or higher brightness and/or lower saturation than the auxiliary colors. If the picture is constituted with various hues, the emphatic colors are chosen from colors which are regarded as contrastive as possible to the hues of the basic color and auxiliary colors. In any event, the emphatic colors are selected from the colors which make a large difference in numerical values, assuming that these colors are numerically expressed, from the basic and auxiliary colors.

One basic color painted sample is provided for one picture. On the other hand, it is preferable that two or three auxiliary and emphatic color painted samples are provided for one picture. Color selection may be difficult if more than three auxiliary and emphatic color samples are provided. A range of 2–3 is the most suitable for color selection.

A color book can be a sheet of cardboard or a series of cardboards in which a plurality of the aforementioned color cards are arranged. The color book is suitable for actual color selection since it can offer various harmonious colors which may appear appropriate to an object to be painted. For example, if the color book is constituted from a sheet of cardboard, plurality sets of picture and painted samples for a color card may be arranged per row or column.

The color book as described in the above helps the user to select harmonious colors since a picture sample comprising the colors for choices is also shown to the user.

Now, the present embodiment is described in detail by way of drawings.

Figure 9:
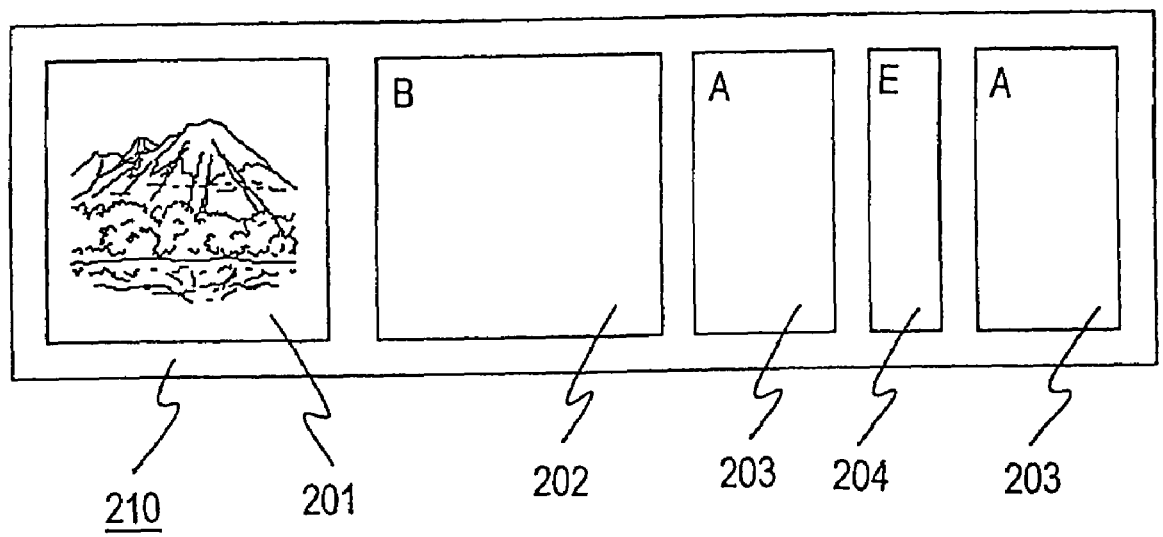
FIG. 9 is a plan view of a color card according to a third embodiment of the present invention.

FIG. 9 shows a plan view of a color card 210. The color card 210 comprises a picture of a mountain scene in the leftmost side. To the next to the picture, the color card 210 also comprises, from the left toward the right side, a basic color painted sample being light bluish gray in a range of 2.5PB hue, an auxiliary color painted sample being fresh green which is classified into soft yellowish green of 5G hue, an emphatic color painted sample being yellowish green classified into dark green of 5GY hue, and an auxiliary color painted sample being light bluish purple of 10PB hue. In FIG. 9, the reference number 201 indicates the colored picture, the reference number 202 indicates the basic color painted sample, the reference number 203 indicates the auxiliary color painted sample, the reference number 204 indicates the emphatic color painted sample, and the reference number 210 indicates the color card. A photo is glued to the color card to make a picture sample, and a paper is painted with an emulsion paint of a predetermined color and is glued to the color card to make a painted sample. In the figures, 'P' indicates "picture", 'B' indicates "basic color", 'A' indicates "auxiliary color", and 'E' indicates "emphatic color".

Figure 10:
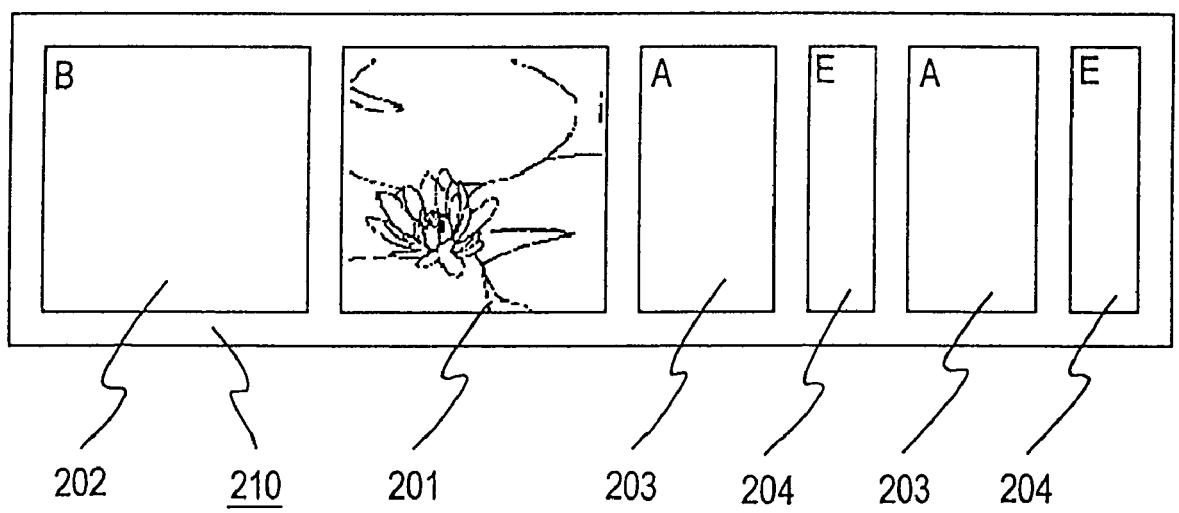
FIG. 10 is a plan view of a color card according to a first modification of the third embodiment.

FIG. 10 shows a plan view of a color card having another arrangement of samples as a first modification. The color card comprises, from the left toward the right side, a basic color painted sample, a picture showing a blooming water lily, an auxiliary color painted sample, an emphatic color painted sample, an auxiliary color painted sample, and an emphatic color painted sample. The colors of the painted samples are, from left to right, light yellowish green of 7.5GY hue, light yellowish green of 10GY hue, deep yellowish green of 10GY hue, light purple of 7.5P hue, vivid purple of 7.5P hue. Proofs are created from a photo and printed to make a picture, and a paper is painted with an emulsion paint of a predetermined color and is glued to the color card to make a painted color sample.

Figure 11:
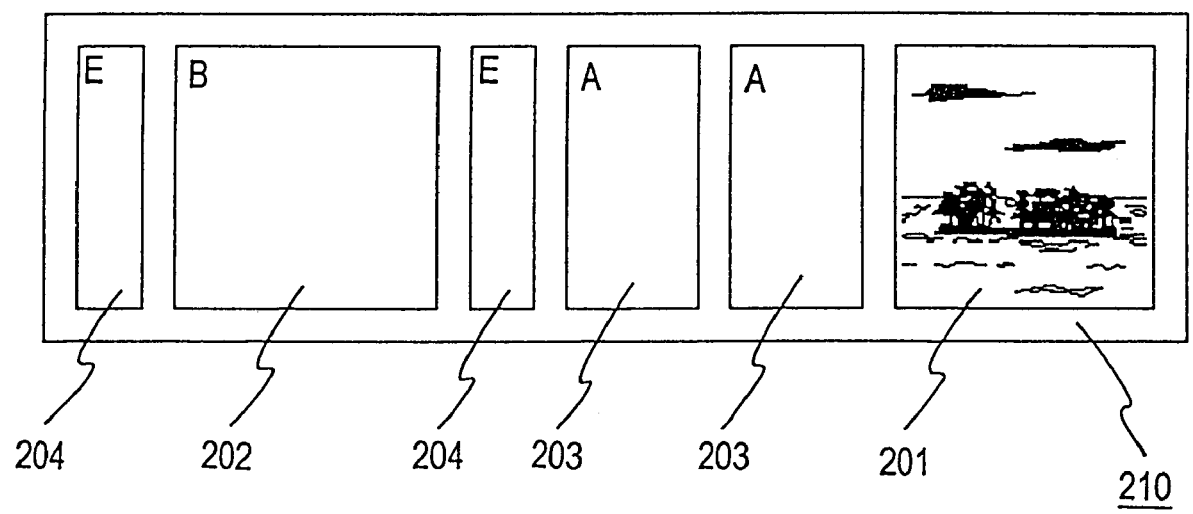
FIG. 11 is a plan view of a color card according to a second modification of the third embodiment.

FIG. 11 shows a plan view of a color card having another arrangement of samples as a second modification. This color card comprises, from the left toward the right side, an emphatic color painted sample, a basic color painted sample, an emphatic color painted sample, an auxiliary color painted sample, an auxiliary color painted sample and a picture of sunset clouds. The colors of the painted samples are, from left to right, indigo blue classified into dark blue of 2.5PB hue, light reddish purple of hue 5RP hue, dark reddish blue of 5RP hue, dull reddish purple of 5RP hue, and dull blue of 10B hue. In this modification, arrangement of the emphatic colors on both sides of the basic color helps the user to determine the combination of colors. Proofs are created from a-photo and printed to make a picture, and a paper is painted with an emulsion paint of a predetermined color and is glued to the color card to make a painted color sample.

Figure 12:
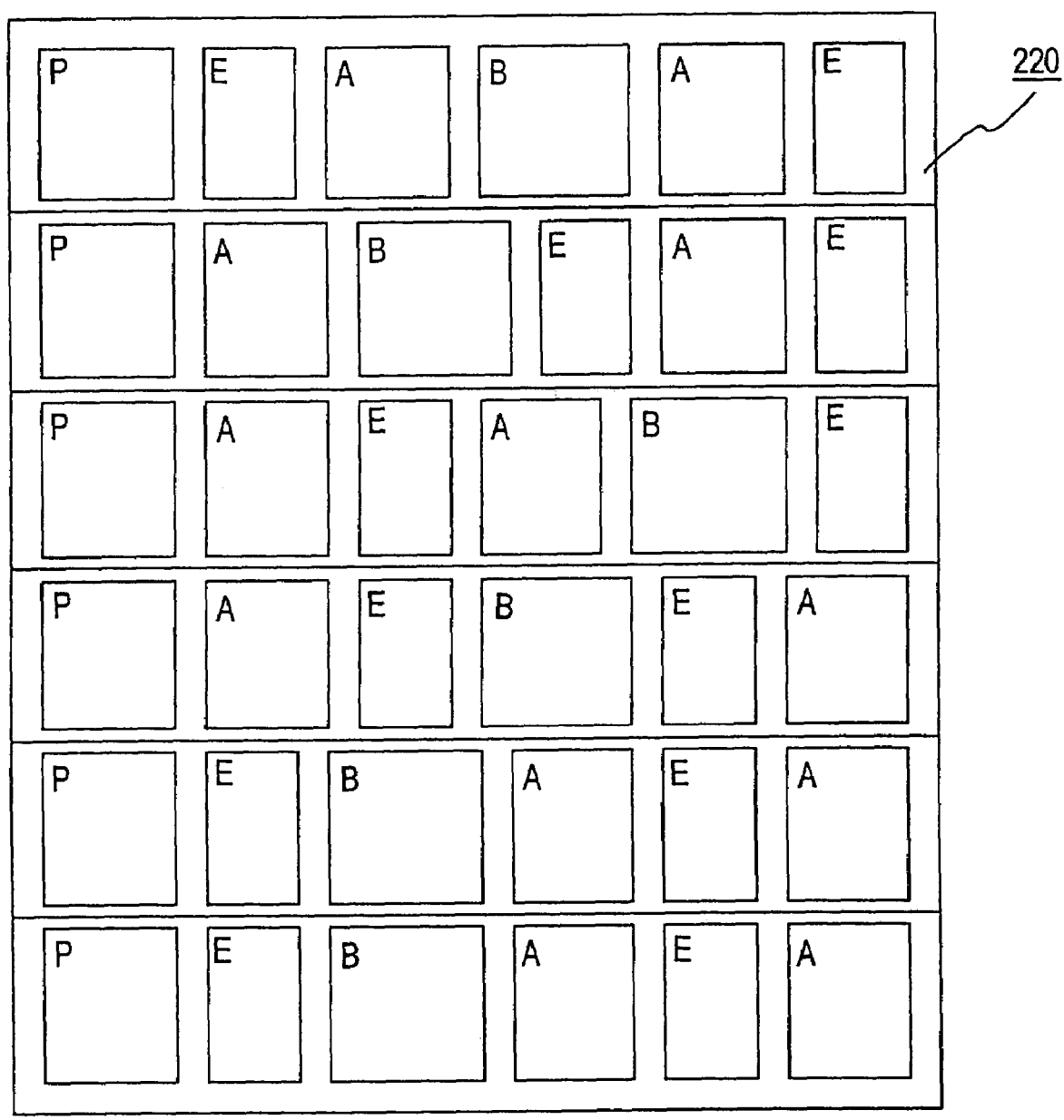
FIG. 12 is a plan view of a color book according to a third modification of the third embodiment.

FIG. 12 shows a plan view of a color book as a third modification. A whole color book is indicated by the reference number 220. In this example, the color book is a sheet of cardboard comprising six color cards. Each picture is arranged in the leftmost row, and basic, auxiliary and emphatic color samples are randomly arranged to the right of the picture. The basic color sample is arranged in neither of the ends in order to simplify comparison between the basic color and the other auxiliary and emphatic colors.

Figure 13:
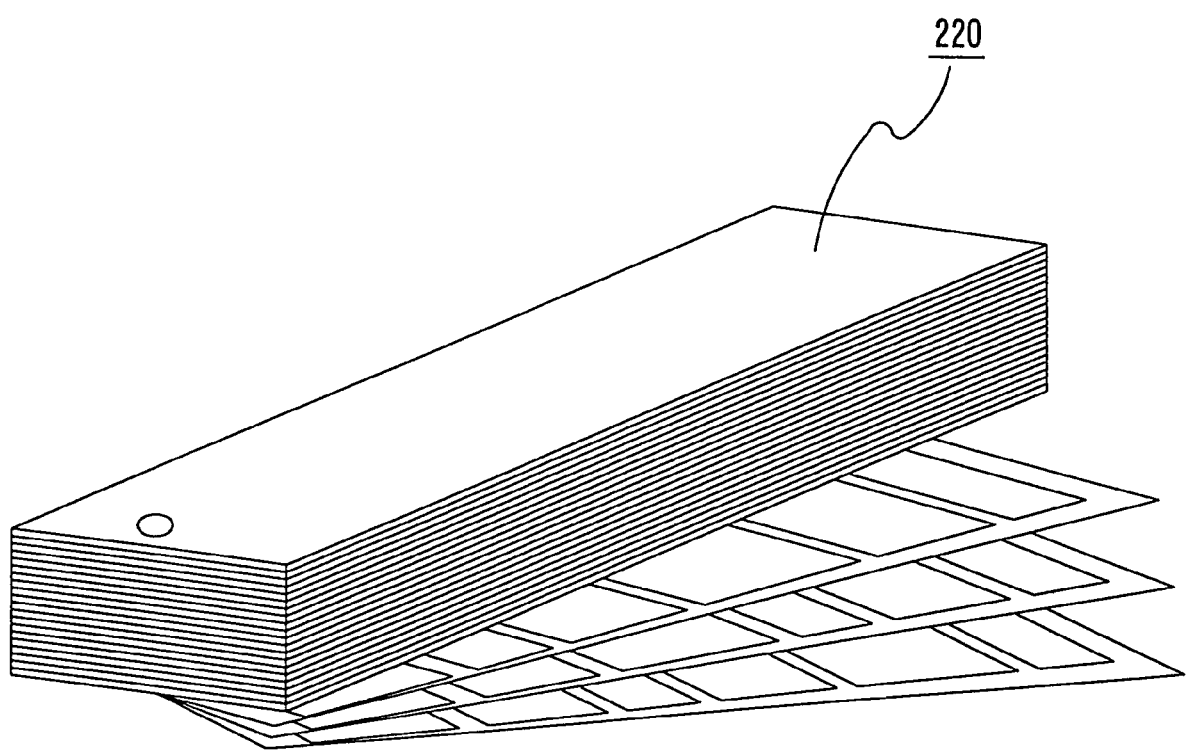
FIG. 13 is a perspective view of a color book according to the third embodiment.

FIG. 13 shows a perspective view of a color book 220 of another modification. The color book 220 comprises a series of rectangular color cards totaling to ten. There is a blank portion on one end of each color card, within which a hole to bind ten color cards is created. The color cards are bound with a stopper, and it is possible to fan out the required or desired cards at desired angles for comparison.

A color card in the present embodiment can comprise a photo as a picture. Photos can show real colors of nature, etc. as we find them. Photos allow the user to select harmonious colors based on a particular image.

Accuracy of the displayed colors is very important upon presentation of colors. Printing of silver films or printing by color printers does not reproduce colors perfectly. The color samples of the present embodiment are prepared by painting emulsion paint on paper. A range of colors to be managed by the paints is fixed and narrow. By painting and drying the paints on paper, it is possible to obtain accurately reproduced colors.

It is possible to arrange a basic color and emphatic colors such that the basic color is in the middle and the emphatic colors are on both sides of the-basic color.

There is usually a harmony between the basic and emphatic colors in that their hues or tones are contrastive to each other. Arranging the emphatic colors right next to the basic color allows the user to check the combination and also helps the user to grasp an image for color planning.

The aforementioned color book can display plural sets of color cards on a sheet of cardboard. This allows the user to fix a color as one of the basic, auxiliary and emphatic colors to an object to be painted and choose the other desired colors.

In addition to the above description, further modifications as in the following can be made.

The color card can be in a rectangular form, which makes the color card easy to carry or store. The above color card can have a blank part in either end or both ends thereof. This blank part can be a margin for binding a plurality of color cards or a part to be touched by the user so as not to dirty color samples therein.

Color cards with a margin can be bound easily to make a color book. A color book constituted from rectangular-shaped color cards is easy to carry and saves space for storage. Also, one-sided binding allows the user to compare only several color cards the user wishes to view by fanning out the same at appropriate angles.

It is possible to indicate descriptions of colors of painted samples arranged in a color card on the back of the color card or on another paper or the like having the same shape as the color card. The descriptions include the name, derivation, tone series, JIS brightness/saturation range and the color according to the Munsell color system. The name of the color can be expressed by ISCC-NBS color name, systematic color name (Japan Color Enterprise Co., Ltd.), JIS general color name, idiomatic color name, traditional color name, colorant name, etc.

The color card with the color description expands a scope of selection by color name (e.g. image building) and provides a selection criterion (e.g. selection of colors having the same tone or colors belonging to a specific tone) to the user.

The pictures in the color cards may only include specific pictures, such as of nature. The pictures of nature help the user to select colors which harmonize with the surroundings, when the color cards are used for determining colors for the interior or exterior of buildings, interior furnishings, decoration or outdoor structures. The pictures of nature have colors familiar to the eyes, and they offer no discomfort in combinations of the basic, auxiliary and emphatic colors.

The pictures in the color cards may only include paintings or photos by a particular author. Frequently, the authors have their favored colors in their works. The pictures of a particular author are helpful to determine the colors of interior fittings of a space where those pictures are to be displayed. Because the basic, auxiliary and emphatic colors of the pictures can be indicated in the color cards.

It is possible to create a color book which can be folded. It is also possible to create a color book, in each page of which several sets of color cards are collectively arranged. This allows the user to view many color samples at a glance. If the color cards of the present embodiment are classified into groups based on the pictures and nicely arranged per page, selection of colors can be further advantageous for the user.

What is claimed is:

1. A color card comprising at least three color samples wherein
   a light color sample expressing the lightest color in the color samples occupies a larger space than the color samples expressing the other colors and is positioned on the color card between the other color samples.

2. The color card as set forth in claim 1 wherein
   a deep color sample expressing the deepest color in the color card is arranged on one side of said light color sample, and
   a neutral color sample expressing a neutral color which stands between the light color sample and the deep color sample is arranged on the other side of the light color sample.

3. A color book comprising a plurality of color cards set forth in claim 1.

4. The color book as set forth in claim 3 wherein said plurality of color cards are classified into groups by impression received from one of colors of light, deep and neutral color samples.

5. The color book as set forth in claim 4 wherein the color book is a collection of a plurality of grouped color books.

6. A color card comprising a light color sample expressing the lightest color, a deep color sample expressing the deepest color and a neutral color sample expressing a neutral color which is a color standing between the light color sample and the deep color sample, the deep color sample being arranged on one side of the light color sample, the neutral color sample being arranged on the other side of the light color sample, the light color sample occupying a lamer space than the other color samples, wherein
   a plurality of deep color samples and/or neutral color samples are provided to constitute a deep color display portion and/or a neutral color display portion, respectively, and
   the deep and/or neutral color samples express deeper colors in the respective color display portions as they are farther from the light color sample.

7. A color card comprising at least three color samples wherein
the at least three color samples include one or more basic color sample, auxiliary color sample and emphatic color sample, the basic color sample expressing a basic color which is a key color of the color card, the auxiliary color sample expressing an auxiliary color which introduces changes to the basic color, the emphatic color sample expressing an emphatic color which strengthens the overall impression of the color card, and
the basic color sample expressing the basic color is positioned between the color samples expressing the other colors and occupies a larger space than color samples expressing the other colors, and the emphatic color sample expressing the emphatic color occupies the smallest space in the color card.

8. The color card as set forth in claim 7 wherein the basic color sample, auxiliary color sample and emphatic color sample are arranged side by side, the basic color sample being in the middle part of the color card, the auxiliary color sample being on one side of the basic color sample, and the emphatic color sample being on the other side of the basic color sample.

9. The colorcard as set forth in claim 7 wherein the color card shows one basic color sample, and two or more auxiliary and emphatic color samples, respectively.

10. The color card as set forth in claim 7 wherein the basic, auxiliary and emphatic color samples have the same hue but different brightness and/or saturation.

11. A color book comprising a plurality of color cards set forth in claim 7.

12. The color book as set forth in claim 11 wherein the plurality of color cards in said color book are classified into groups by Impression received from one of colors of basic, auxiliary and emphatic color samples.

13. The color book as set forth in claim 12 wherein the color book is a collection of the grouped color books.

* * * * *